235-379
9/8/87
SR
OR 4,692,600

United States Patent [19] [11] Patent Number: 4,692,600
Takahashi [45] Date of Patent: Sep. 8, 1987

[54] SYSTEM AND METHOD FOR AUTOMATIC TRANSACTION

[75] Inventor: Kenichi Takahashi, Niigata, Japan
[73] Assignee: Hitachi, Ltd., Tokyo, Japan

[21] Appl. No.: 736,702
[22] Filed: May 22, 1985

[30] Foreign Application Priority Data

Jul. 31, 1984 [JP] Japan ............................. 59-159060

[51] Int. Cl.[4] ............................................ G06K 5/00
[52] U.S. Cl. ..................................... 235/379; 235/380
[58] Field of Search ............................... 235/379, 380

[56] References Cited

U.S. PATENT DOCUMENTS 4,423,313 12/1983 Tanigaki ............................. 235/379
4,438,326 3/1984 Uchida ............................... 235/379
4,464,733 8/1984 Misker ................................ 235/379
4,495,627 1/1985 Nishimura ........................... 235/379

*Primary Examiner*—Harold I. Pitts
*Attorney, Agent, or Firm*—Fay, Sharpe, Beall, Fagan, Minnich & McKee

[57] ABSTRACT

An automatic transaction system is provided with a card reader which reads the data from a card with information identifying a user recorded thereon, when said card is inserted, an operating unit which is provided with transaction selection keys operated to input the kind of transaction a user wants, and an amount key employed to input an amount of money to be transacted and others, and a display unit which displays the instructions for said operating unit for the user. Whether or not a plurality of transactions are to be performed repeatedly is input to said operating unit by a repeated transaction key. A plurality of transactions are performed repeatedly by a control unit, based on the data read from said card reader and the operation of said repeated transaction key.

10 Claims, 11 Drawing Figures

SYSTEM AND METHOD FOR AUTOMATIC TRANSACTION

BACKGROUND OF THE INVENTION

The present invention relates to an automatic transaction system which handles paper money automatically in financial institutions such as banks by reading cards, and in particular it relates to the system which is suited to a plurality of transactions on one occasion.

General automatic transaction systems have a construction in which a single transaction or a variety of transactions are set so that a user (customer) can perform a transaction by inserting his card once.

A system disclosed in the Official Gazzette on Japanese Patent Laid-Open No. 32596/1973, for instance, is constructed so that it enables the selection of payment of cash and transfer to another account, while enabling the release of cash or the automatic transfer of a paid amount on data to said account without releasing cash according to the selection of payment or transfer. Meanwhile, a system disclosed in the Official Gazette on Japanese Patent Laid-Open No. 37342/1978 is designed so that it can operate to transfer an amount equivalent to the amount of money received from a user to an account of a specified transferee read from a card on which information on the deposit of the user and the account number of said account are recorded, thus enabling simple transfer operations to the apecified transferee without recording the number of his account.

When one user desires to perform a plurality of transactions in the systems disclosed in the above-mentioned Official Gazettes, however, he is required to conduct an initial operation, that is insert a card, for every transaction. He must pull out the card after the completion of one transaction and insert said card again to perform another transaction. Thus, the user must put the card in and take it out for each transaction, while entering his code number and other data, which results in the disadvantage that repeated transactions take much time.

SUMMARY OF THE INVENTION

An object of the present invention is to provide a system and a method for automatic transactions, by which a plurality of transactions are performed repeatedly.

Another object of the present invention is to provide a system and a method for automatic transactions, by which transactions of different kinds are performed simultaneously.

A third object of the present invention is to provide a system and a method for automatic transaction, by which the time required for transactions is reduced.

The present invention has a construction in which the operating unit having transaction selection keys and an amount key to input an amount of money to be transacted and other data is provided with a repeated transaction key to input whether transactions are performed at desired times, and a means is provided to enable repeated transactions at desired times by the operation of said repeated transaction key when a card reading mechanism is driven, so that the number of operations including operations to put in and take out a card can be reduced to the minimum.

BRIEF DESCRIPTION OF THE DRAWINGS

FIGS. 74 and 7B are flowcharts of a procedure of operations corresponding to the illustration of FIG. 6, which shows a second embodiment of the automatic transaction system according to the present invention.

DETAILED DESCRIPTION OF THE INVENTION

Figure 1:
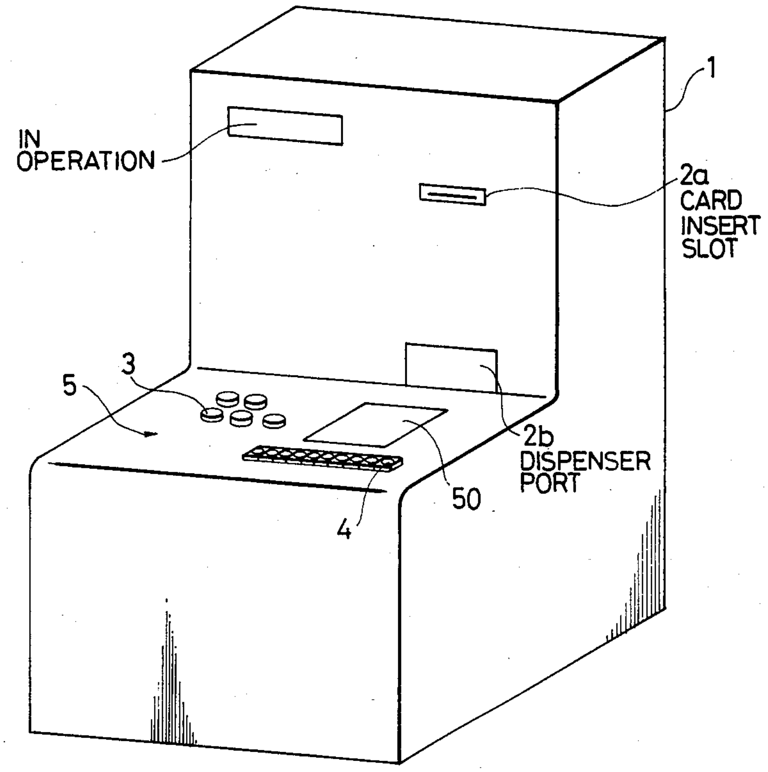
FIG. 1 is a plan view of an automatic cash transaction system which is a first embodiment of the present invention.

The following is a description on the present invention with reference to appended drawings. FIGS. 1 to 4 show a first embodiment of the present invention which is applied to an automatic cash transaction system.

The automatic cash transaction system of this embodiment is disposed in the front upper portion of a main body 1 of an apparatus, and a card insert slot 2*a* into which a magnetic card A with identification recorded thereon is inserted removably, and a dispenser port 2*b* which is provided below said card insert slot to dispense paper money and a detailed transaction slip, are formed therein. Moreover, an operating unit 5 having transaction selection keys 3 to select and input the kind of transaction and amount keys 4 to input the amount of money to be transacted and a personal code number, etc. is provided in a console of the main body 1 to enable a user to conduct a transaction, while a display unit 50 is provided in said console to display instructions for the user.

Figure 2:
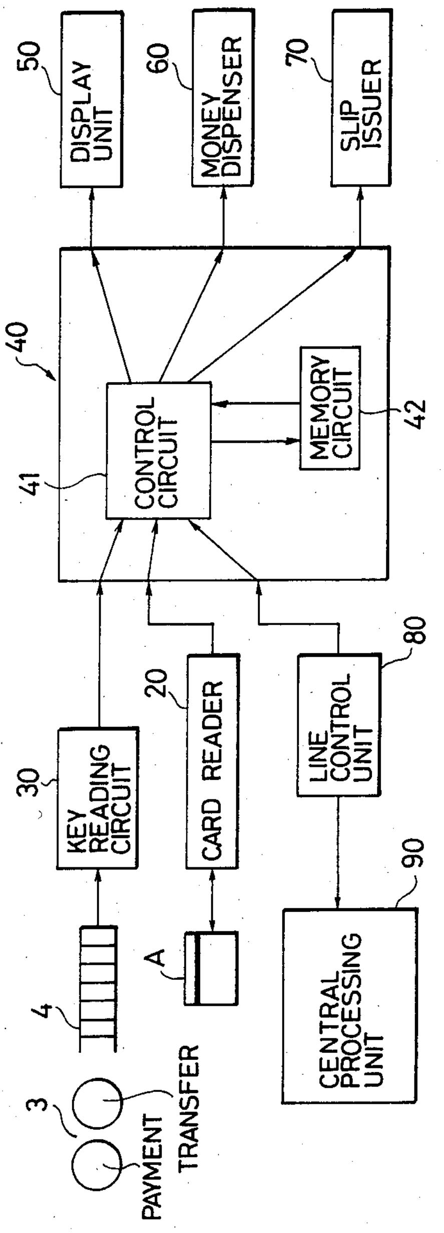
FIG. 2 is a block diagram of the automatic cash transaction system.

FIG. 2 is a block diagram showing the entire construction of the system. In this figure, numeral 20 denotes a card reader which operates when a magnetic card A is inserted into the card insert slot 2*a*. The reader conveys the magnetic card A to a prescribed position, reads data from the magnetic card, and returns the card to the insert slot 2*a* when the transaction is complete. Numeral 30 denotes a key reading circuit which reads the content which the user (customer) inputs from the operating unit 5 in response to instructions display from said display unit 50.

Numeral 60 denotes a paper money dispenser which takes out bank notes from a cash box and conveys them to the release port 2*b* when the transaction is repayment. Numeral 70 denotes a slip issuer which prints the content of the transaction on an entry journal for the financial institution and a detailed transaction slip to be delivered to the user and dispenses said detailed transaction slip to the dispenser port 2*b*.

Numeral 40 denotes a control unit comprising a control circuit 41 and a memory circuit 42. This unit performs the transfer of data to and from the above-stated devices, controlling each of them in accordance with a program stored in said memory circuit 42. Numeral 90 denotes a central processing unit, which checks and updates information on the user and transmits the result of the processing to the control circuit 41 through a circuit controlling unit 80.

Figure 3:
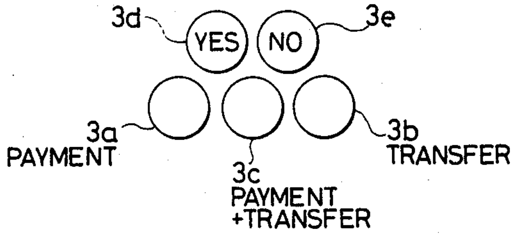
FIG. 3 is an enlarged view of transaction selection keys to the operating unit.

In the present embodiment, as shown in FIG. 3, the transaction keys 3 of the aforesaid operating unit 5 comprise single keys *3a* and *3b* each of which inputs one kind of transaction, and a combination key *3c* to input transactions of different kinds in combination. Said single keys *3a* and *3b* input information on payment and transfer transactions respectively in the present embodiment, and by pressing either of the keys, a transaction corresponding thereto can be input. Said combination key *3c* enables the simultaneous input of information on transactions of different kinds when it is pressed. It functions, for instance, to input data on two kinds of transactions; payment and transfer. By operating the combination key *3c*, combined transactions can be performed at the same time.

Also, the said operating unit 5 is provided with repeated transaction keys *3d* and *3e* to input an information on whether a transaction is to be performed repeatedly to the transaction selection keys 3 and the amount key 4. Said repeated transaction keys *3d* and *3e* are provided to input information on whether transactions of the same kind or transactions of different kinds are to be repeated. A YES key and a NO key are employed, for instance, as these successive transaction keys *3d* and *3e*, and a transaction can be repeated by pressing the YES key in response to displayed instructions, while no subsequent transaction is conducted when the NO key *3e* is depressed.

Figure 4:
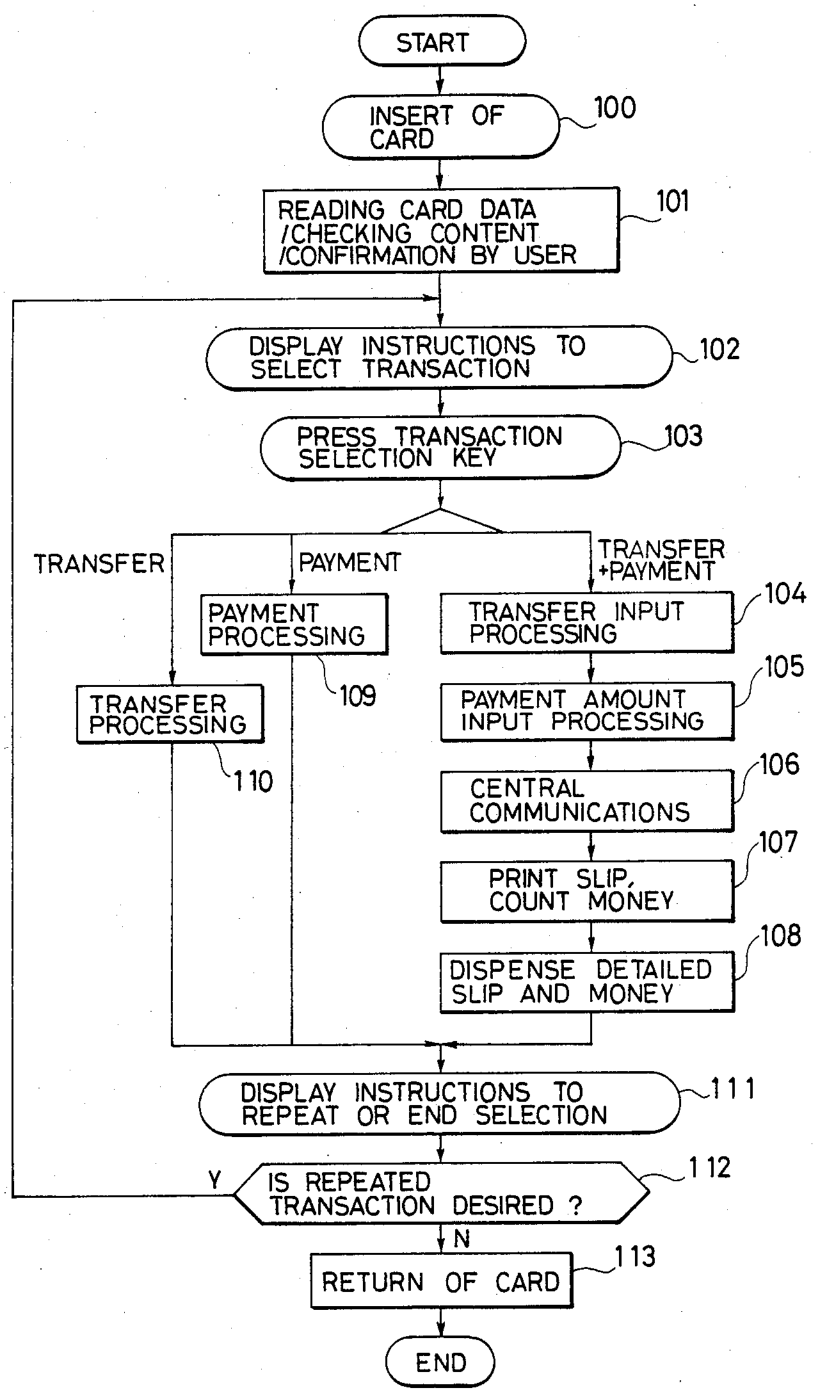
FIG. 4 is a procedure flowchart of a procedure of operations.

Next, a transaction will be described with reference to a flowchart shown in FIG. 4.

When a user inserts a magnetic card A into the card insert slot *2a* (step 100), the card data recorded on said magnetic card A is read by the card reader 20 and sent to the control circuit 41, whereby the content (information) of the deposit of the user is checked (step 101) and, the personal code number input by the customer is checked. Hereinafter numerals alone are given in parenthesis. The magnetic card A is returned when the check shows that the content is not normal, while a message "Select transactions" is displayed by the display unit 50 (102) when said check shows normality. In response to the display, the user selects one of the transaction selection keys 3 of the operating unit to input a transaction (103).

When the user pushes the combination key *3c* desiring both payment and transfer transactions on the occasion, first a transfer input processing is performed (104), and then a payment amount input processing (105). In said transfer input processing, the data on the transferee's bank, a transfer account and a transferred amount are sent to the control unit 40 when the user inputs this data in a prescribed form by operating the amount key 4 in response to the display in the display unit 50. In the above-stated payment amount input processing, the data on an amount to be repaid are sent to the control unit 40 when the user inputs said data in the prescribed form.

Then, the input data on the transfer and payment amounts are sent from the control unit 40 to the central processing unit 90 through a line control unit 80, and said central processing unit 90 processes the data, checking and renewing information on the user, and transmits data on the propriety of the transaction to the control unit 40 based on the result of the above processing (106). Said control unit 40 performs processing on the basis of the data sent from the central processing unit 90. More precisely, it performs processing to suspend the transaction when it receives from unit 90 an instruction to suspend the transaction, while it drives the slip dispenser 70 and the money dispenser 60 to print the content of the transaction on a slip and to count the number of sheets of paid bank bills and the value thereof (107) and to release the slip with the details of the transaction recorded and the bank bills to the dispenser port *2b* (108), when it receives from said unit 90 an instruction to perform the transaction. Then, both contents of transfer and payment transactions are printed on the detailed transaction slip. Thus, the user can receive the detailed transaction slip and the money.

As described above, transactions of two kinds (payment, transfer) can be performed at the same time by operating the combination key *3c*, and thus said transactions can be performed with just one insertion of the magnetic card A and just one input of personal code number by the customer.

When the user pushes the payment key *3a* for performing a single transaction, processings similar to steps 105 to 108 above is performed (109), and thereby the detailed transaction slip with a payment amount printed thereon is released. When the user pushes the transfer key *3b*, on the other hand, processing similar to steps 104 and 106 to 108 above is performed (110), and thereby the detailed transaction slip with a transferred amount printed thereon is dispensed. Thus, the user can also perform single transactions.

After these transactions are complete, a message "Is another transaction desired?" appears on the display unit 50 (111), and whether or not transactions are performed repeatedly is determined (112), based on which of the transaction keys *3d* and *3e* is repeatedly pressed by the user.

When the user presses down the NO key *3e*, it is determined that another transaction is not desired. Consequently, the magnetic card A is returned to the card insert slot *2a* (113), and when the returned card A is received by the user, the transaction is complete. When the user presses the YES key *3d*, it is determined that another transaction is desired, and processing beginning with step 102 is repeated. By pressing any one of the transaction selection keys 3 with the YES key *3d* depressed, single transactions, as well as combined transactions, can be performed repeatedly. Thus, the transactions can be performed as needed only by inserting the magnetic card A only once and inputting the personal code number only once.

Figure 5A:
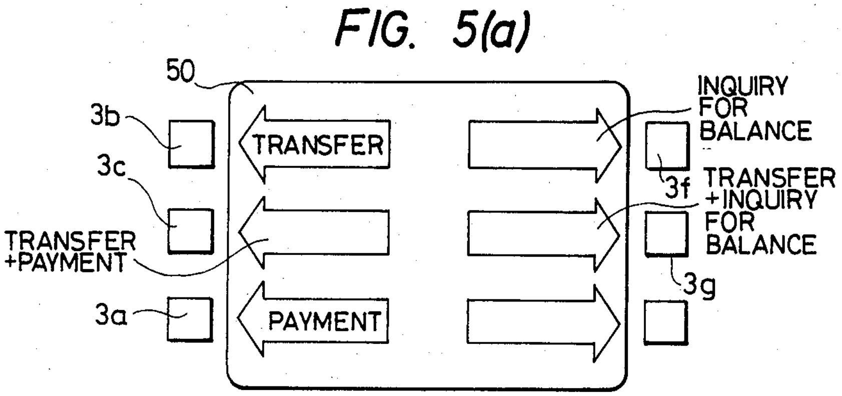
FIGS. 5(*a*) and (*b*) are illustrations of transaction selections and a successive transaction, respectively, showing another example of combination of the transaction selection keys with a display unit.
Figure 5B:
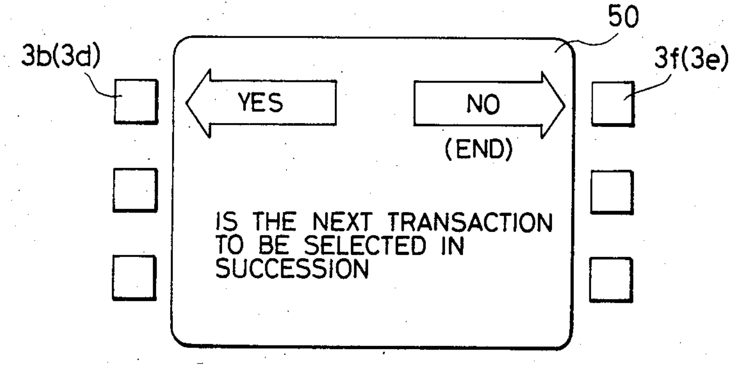

The transaction selection keys 3 are designed to have specific functions in the embodiment shown in the above-mentioned figures, and three transaction selection keys are provided in this case in accordance with the kinds of transactions. In this connection, the number of the transaction selection keys would be increased unfavorably with an increase in the kinds of transactions. This unfavorable increase in the number of keys can be prevented by a construction in which the transaction selection keys are designed so that they can be operated to input functions corresponding to expressions displayed on a screen of a display unit. The display unit 50 is so constructed that messages are displayed on the CRT screen, a caption film or the like, as shown in FIG. 5 (*a*), while the keys 3 are arranged at positions corresponding to said various selection messages. When a key 3 is pressed in this construction, the function indicated by the message at a position corresponding to said key 3 can be input. Therefore, when a key 3*b* in the upper left portion in FIG. 5 (*a*) is assigned to operate for transfer, and when the same key 3*b* in the upper left portion in FIG. 5 (*b*) is designed to fulfill the same function as the YES key 3*d*, the increase in the number of keys can be prevented, while the same effect as with the first embodiment can be obtained. While the kinds of transactions are limited to payment, transfer, and payment with transfer, in the embodiment shown in the above-mentioned figures, they can be increased, as shown in FIG. 6, by enlarging the dimensions of the screen of the display unit 50, by increasing the number of keys provided, or by other means.

Figure 6:
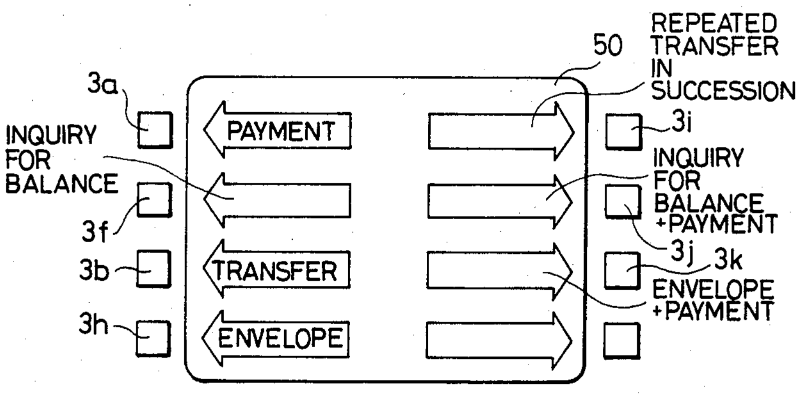
FIG. 6 is an illustration of a third example of combination of the transaction selection keys with the display unit.
Figures 7, 7A:
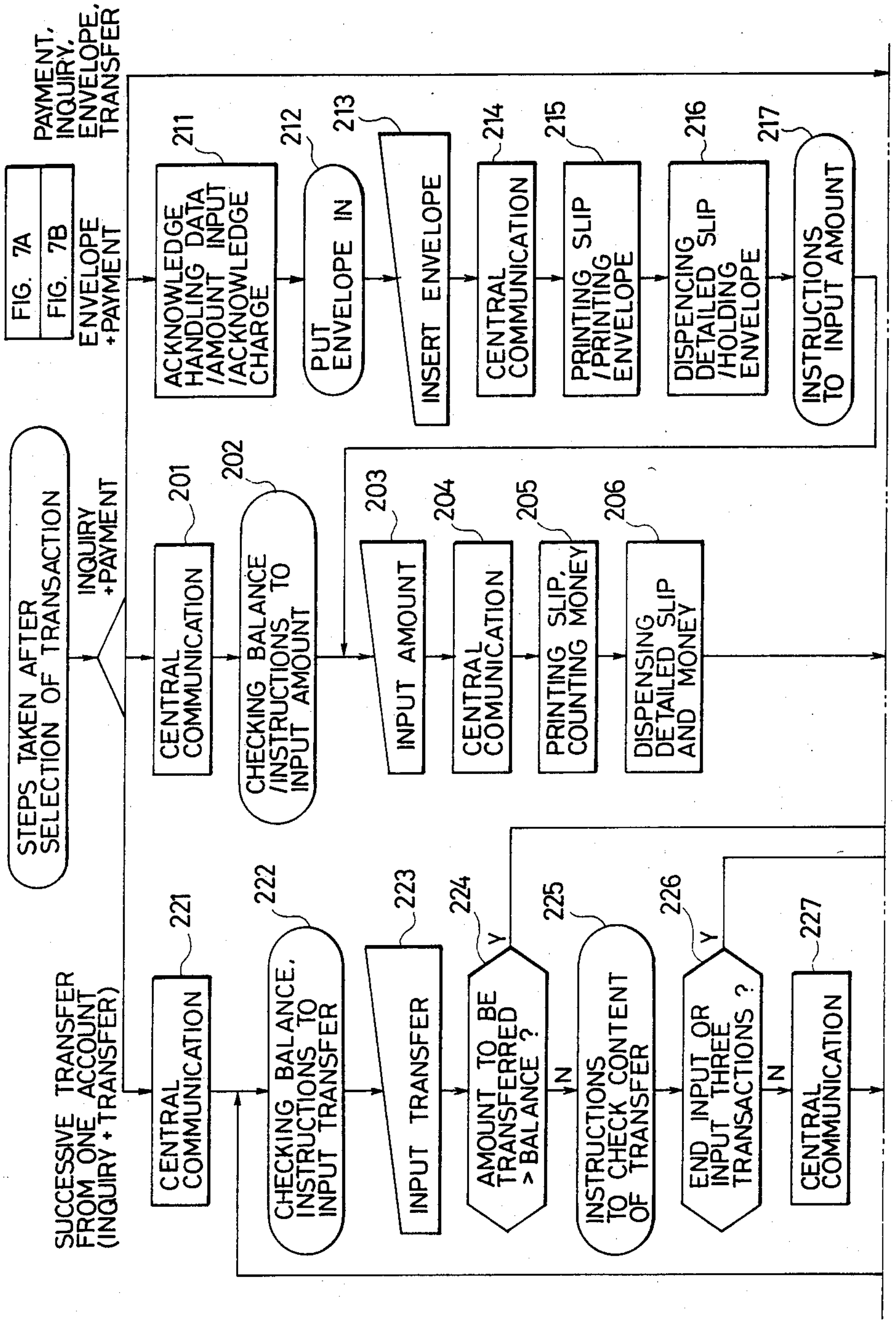
Figure 7B:
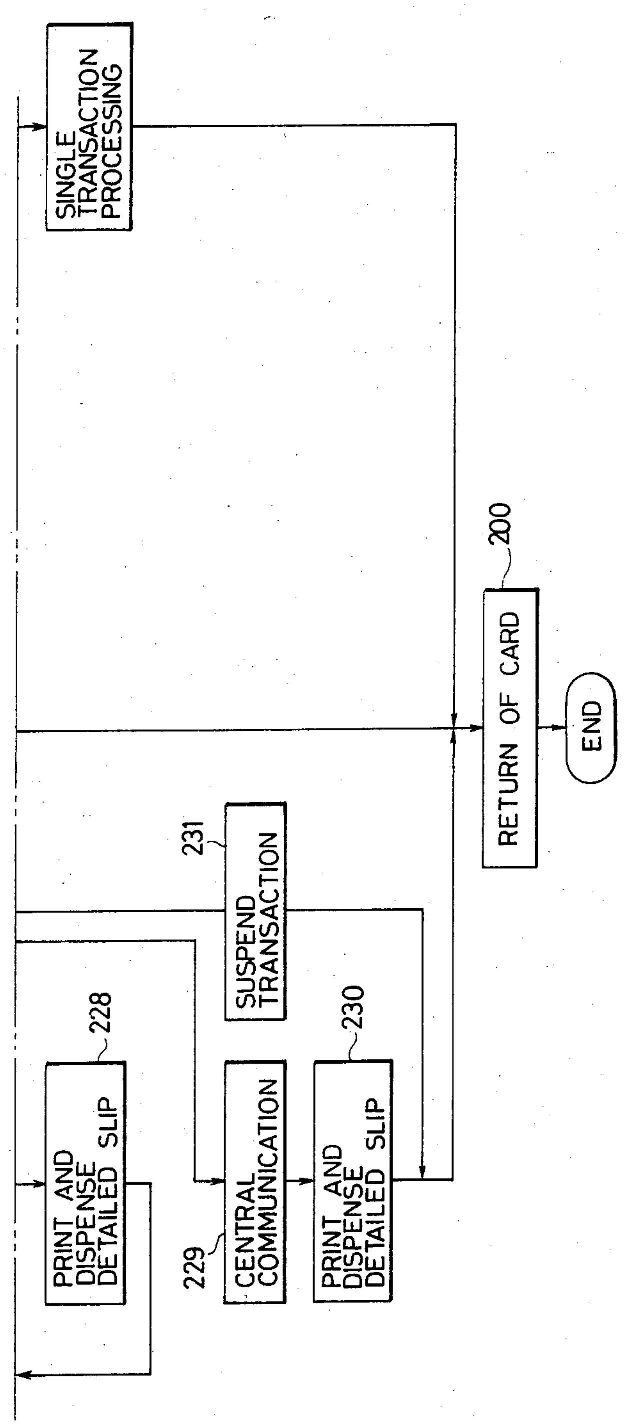

FIG. 7 is a flowchart based on FIG. 6 which shows a second embodiment of the present invention. In this embodiment, the above-described transaction selection keys 3 are so designed as to be able to input single transactions such as payment, transfer, balance inquiry and dispensing an envelope, as well as combined transactions such as payment with inquiry, payment with the dispensed envelope, and to input only transfers repeatedly.

The following is a description on the operations of this embodiment with reference to FIG. 7.

When a user presses a key 3*j* for inquiry+payment, the control unit 40 and the central processing unit 90 (201) communicate, and the control unit 40 causes the display unit 50 to display the user's balance. Then, the display unit 50 displays message "Input an amount to be repaid after checking the balance" (202).

After the amount is input by the user (203), communications is made again with the central processing unit 90 (204). When an instruction to allow a transaction is given as the result of the above processing, a slip is printed and money is counted (205), a detailed transaction slip and the paper money are dispensed (206), the magnetic card A is returned (200), and the transaction is complete.

When a key 3*k* for an envelope+payment is input by the user, information on the amount and other data which is required for printing the envelope is also input thereby (211), and then message "Put the envelope in" is displayed (212). When the envelope is put in in response to said message, communications are conducted with the central processing unit 90, a slip and the envelope are printed in response to the communications (215), and then the envelope is put in a cash box to be held, while a detailed transaction slip is dispensed (216). Next, after the envelope dispensing transaction has ended, a message directing payment transaction is displayed (217), steps 203 to 206 and 200 are performed in the same way as in the transaction of inquiry+payment, and the transaction is ended.

When the user presses a key 3*i* for repeated transfer, communications are made with the central processing unit 90 (221), and after information on a balance displayed in accordance with the result of the above processing has been checked by the user, an expression "Input transfer after checking the balance" is displayed by the display unit 50 (222). When an amount to be transferred is input by the user (223), it is compared with the balance (224). If the comparison shows that the amount to be transferred is greater than that of the balance, a processing is conducted the transaction is suspended (231). If the amount to be transferred is smaller than that of the balance, a display is made directing the confirmation of the content of the transfer (225). When the user inputs his confirmation, it is determined that the confirmation is input, while it is determined whether the operation of the above confirmation input is the third one (for the third transaction) (226).

When the operation of the confirmation input is the first one (for the first transaction), communication is conducted with the central processing unit (227), and the content of the transaction is printed on a slip according to an instruction to allow the transaction, and a detailed transaction slip thus prepared is dispensed (228). Subsequently, 222 to 228 are repeated. When the confirmation input is determined to be the third or higher at step 226, processong described hereunder is conducted. When the confirmation input is the third one, steps 226 to 229 and 230 are performed, and the detailed slip is dispensed. In this case, the system is set by the operation of the repeated transfer key 3*i* so that the first to third transfers can be performed repeatedly provided that the transferred amount is within the balance.

A description of single transactions is omitted, since single transactions are performed in this case as described with reference to FIG. 4.

Figure 8:
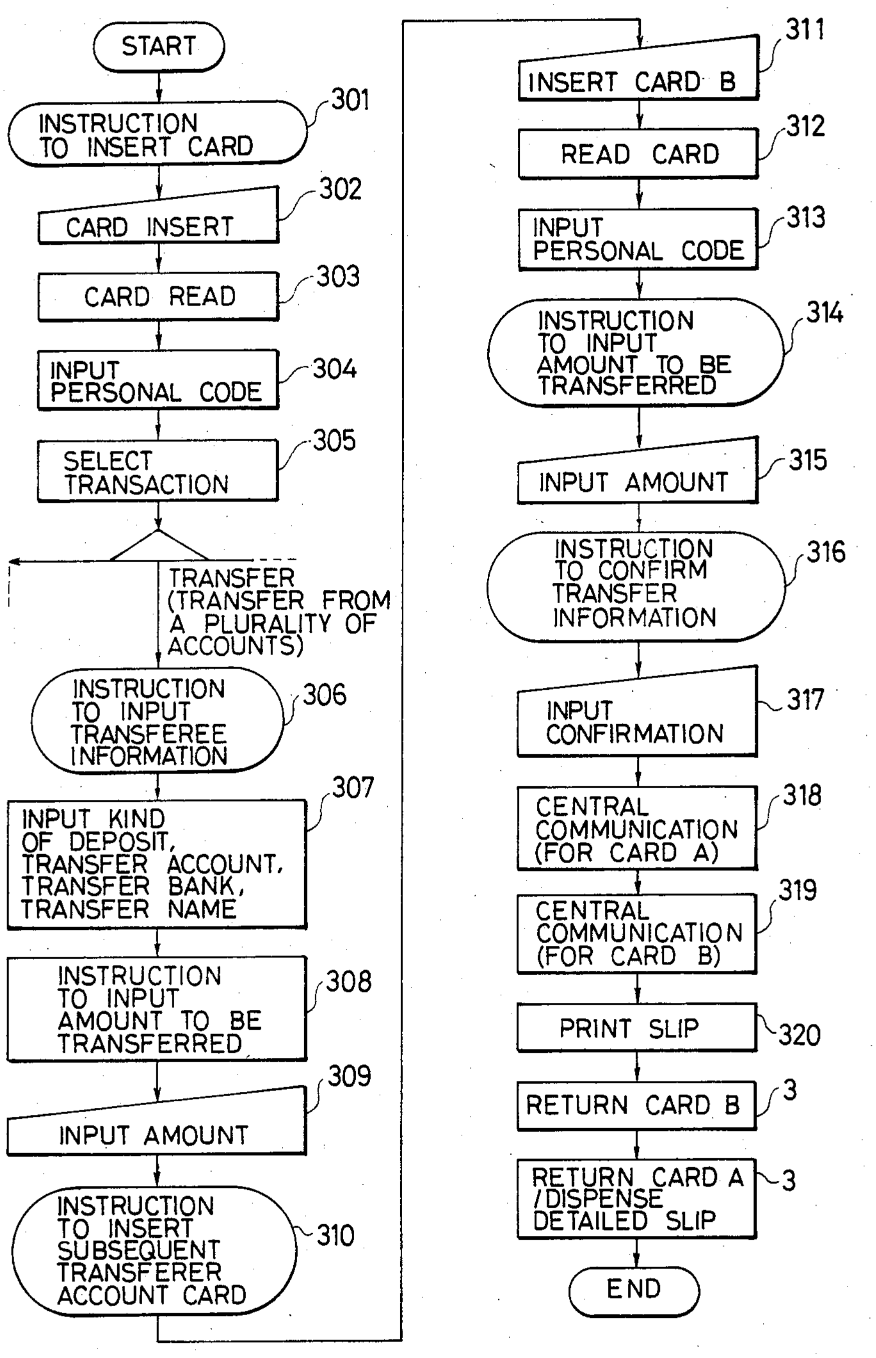
FIG. 8 is a flowchart of a third embodiment of the automatic transaction system according to the present invention.

FIG. 8 is a flowchart showing a third embodiment of the present invention. In this embodiment, the system is so designed that transfers can be made from a plurality of accounts to one account of a transferee, while transfers are made from a single account to one or a plurality of accounts of a transferee in the foregoing two embodiments.

When the display directs the user to insert a card (301) and a magnetic card A is inserted (302), processing to read card data and check a personal code number input are performed sequentially (303, 304). If an error occurs in these steps, processing to return the magnetic card A and other processing is conducted.

Next, when a transfer is selected, by pressing the transaction selection key (305), an instruction to input information on a transferee in displayed (306), and the name of a transferee's bank, the kind of a deposit and a transfer account, etc. are input (307) according to the instruction. Then, "Input an amount to be transferred from an initial card" is displayed (308) to instruct the user (309). With this processing a transfer input with regard to the magnetic card A initially inserted is complete.

A message "Put in a card for a subsequent transfer" is then displayed (310), and when the second magnetic card B is inserted by the same user (311), steps 303 and 304 are repeated, applied to said card B (312 and 313). Then an instruction to input an amount to be transferred from the second magnetic card B is displayed (314), and the amount for the second magnetic card B is input in response to said instruction (315).

After an instruction to confirm the amounts to be transferred from the two magnetic cards A and B is displayed (316) thereafter, the confirmation is input (317), and then communication is conducted in sequence with respect to the information on the first and second magnetic cards A and B. Next, a slip is printed in response to an instruction directing the transaction, and the magnetic cards A and B and a detailed slip are dispensed (321, 322), whereby the transaction is ended.

With this embodiment, therefore, simultaneous transfers can be performed from a plurality of accounts if these transfers are made to one account.

In any of the above-described embodiments, the kind of transaction is selected after the magnetic card A is inserted. It is a matter of course, in this connection, that a program can be altered so that the transaction can be selected before the magnetic card A is inserted. Moreover, an on-line system in which the control unit 40 is connected to the central processing unit 90 is shown as an example in these embodiments. These embodiments can also be adapted for an off-line system by using a construction in which information required for transactions is stored in the memory circuit 42 of the control unit 40 and this unit performs the same processing as the central processing unit 90 based on said information. Also, the magnetic cards are employed as examples in these embodiments. However, the present invention is not limited to these cards; it can be applied also to a system in which IC cards or optical stripe cards, for instance, are employed.

As described above, the present invention is so constructed that not only transactions of different kinds, but also transactions of the same kind, can be performed as needed by pressing the repeated transaction keys; hence, one user can perform transactions repeatedly without re-inserting the card. With the present invention, therefore, it is unnecessary for one user to repeat such operations as putting the card in and taking it out and entering a personal code number, which produces remarkable effects of saving time and shortening the time required for transactions.

I claim:

1. A system for automatic transactions, comprising:

a medium reader for receiving an inserted medium from a customer and for reading data from said medium in which information identifying said customer is recorded;

a operation unit provided with transaction selection keys comprising single transaction and combination keys to input transactions of different kinds in combination, and a numerical key to input numerical values and personal code number of said customer;

a display unit for displaying instructions for operation to said customer; and a control unit for performing a single transaction based on data read by said medium reader and of said selection keys, and for performing a plurality of different transactions based on data read from said medium and said combination keys, in repsonse to one insertion of said medium to said medium reader and one input of the personal code number by said customer.

2. A system as claimed in claim 1, in which said transactions include an inquiry requesting the value of a balance, and in response to said inquiry, said display unit displays the value of the balance to be confirmed by said customer relative to another transaction performed simultaneously by said control unit.

3. A system for automatic transactions, comprising:

a medium reader for receiving an inserted medium from a customer, and for reading data from said medium in which information identifying said customer is recorded;

a operation unit provided with transaction selection keys comprising a repeated transaction key to input signals specifying whether a next transaction is to be performed successively, and a numerical key to input numerical values and personal code number of said customer;

a display unit for displaying instructions for selection of whether different transactions are to be performed successively for said customer; and a control unit for performing first and second transactions successively based on data from said medium and the signal input by said repeated transaction key, in response to one insertion of said medium to said medium reader and one input of the personal code number by said customer.

4. A system as claimed in claim 3, in which said control unit performs said second transaction when said repeated transaction key is operated by said customer in response to instructions of said display unit after the completion of said first transaction.

5. A system as claimed in claim 3, in which one of said first and second transaction is an inquiry requesting the value of a balance, and in response to said inquiry, said display unit displays value of the balance to be confirmed by said customer in relation to the other of said first and second transaction performed successively.

6. A system for automatic transactions, comprising:

a medium reader for receiving inserted a plurality of media from a customer and for reading data from said media in which information identifying said customer is recorded;

a operating unit provided with transaction selection keys comprising single keys to input a single transaction and combination keys to input a plurality of transactions, and a numerical key to input numerical values and the personal code number of said customer;

a display unit for displaying instructions for operation to said customer; and a control unit for performing a single transaction based on data read from said medium and the operations of said single keys, and for performing a plurality of transactions with a plurality of accounts, based on the read data from said media and the operation of said combination keys, with one insertion of each media and one input of personal code number corresponding to said each medium by said customer.

7. A system as claimed in claim 6, in which said media is inserted into said medium reader in response to the instructions of said display unit by said customer, said transactions to be performed are transfer transactions from a plurality of accounts, and said control unit performs transfers from a plurality of accounts corresponding to said media to an account of a transferee.

8. A method for automatic transactions, comprising:

inserting a medium of a customer;

reading data from said medium including information identifying said customer;

inputting a personal code number to identify said customer;

displaying instructions to select a transaction including a single transaction or a combined transaction;

inputting a transaction based upon said instructions; and performing a single transaction on the basis of the data of the medium read and in accordance with the single transaction input, and performing a plurality of transactions simultaneously on the basis of the same data from said medium when said transaction is a combined transaction, in response to one insertion of said medium and one input of said personal code number by said customer.

9. A method for automatic transactions, comprising:

inserting a medium of a customer;

reading data from said medium including information identifying said customer;

inputting a personal code number to identify said customer;

displaying instructions to select a kind of transaction including a single transaction or a repeated transaction;

inputting a signal specifying the kind of transaction based on said instruction; and performing a prescribed transaction on the basis of the data of the medium read and in accordance with the kind of transaction input, and performing first and second transactions successively on the basis of the same data from said medium when said kind of transaction is a repeated transaction, in response to one insertion of said medium and one input of said personal code number by said customer.

10. A method for automatic transactions, comprising:

inserting a medium of a customer;

reading data from said medium including information identifying said customer;

inputting a personal code number to identify said customer;

displaying instructions to select a kind of transaction;

inputting a signal specifying the kind of transaction based on said instructions;

performing a prescribed first transaction on the basis of the data of the medium read and in response to the kind of transaction input;

displaying instructions to select repeated transactions which are to be performed successively on the basis of said data;

selecting the repeated transaction in response to said display; and performing a second transaction successively after completion of said first transaction, in response to one insertion of said medium to said medium reader and one input of the personal code number by said customer.

* * * * *